US007343973B2

(12) United States Patent
Dusterhoft et al.

(10) Patent No.: US 7,343,973 B2
(45) Date of Patent: *Mar. 18, 2008

(54) METHODS OF STABILIZING SURFACES OF SUBTERRANEAN FORMATIONS

(75) Inventors: Ronald G. Dusterhoft, Katy, TX (US); Harvey J. Fitzpatrick, Katy, TX (US); David Adams, Katy, TX (US); Walter F. Glover, Katy, TX (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 237 days.

This patent is subject to a terminal disclaimer.

(21) Appl. No.: 11/056,635

(22) Filed: Feb. 11, 2005

(65) Prior Publication Data

US 2006/0089266 A1    Apr. 27, 2006

Related U.S. Application Data

(63) Continuation-in-part of application No. 10/972,648, filed on Oct. 25, 2004, now Pat. No. 7,267,171, which is a continuation-in-part of application No. 10/407,643, filed on Apr. 4, 2003, now Pat. No. 6,962,200, which is a continuation-in-part of application No. 10/260,888, filed on Sep. 30, 2002, now Pat. No. 6,725,931, which is a continuation-in-part of application No. 10/183,200, filed on Jun. 26, 2002, now Pat. No. 6,729,404, which is a continuation-in-part of application No. 10/163,183, filed on Jun. 4, 2002, now abandoned, which is a continuation-in-part of application No. 10/041,142, filed on Jan. 8, 2002, now Pat. No. 6,668,926.

(51) Int. Cl.
E21B 43/267 (2006.01)

(52) U.S. Cl. .................. 166/280.2; 166/281; 166/295; 507/219; 507/220; 507/924

(58) Field of Classification Search ................ 166/276, 166/280.1, 280.2, 281, 294, 295; 507/219, 507/220, 924

See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | 166/33 |
| 3,375,872 A | 4/1968 | McLaughlin et al. | 166/29 |
| 3,404,735 A | 10/1968 | Young et al. | 166/33 |
| 3,415,320 A | 12/1968 | Young | 166/33 |
| 3,492,147 A | 1/1970 | Young et al. | 117/62.2 |
| 3,659,651 A | 5/1972 | Graham | 166/280 |
| 3,681,287 A | 8/1972 | Brown et al. | 260/67 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |

(Continued)

FOREIGN PATENT DOCUMENTS

CA          2063877          5/2003

(Continued)

OTHER PUBLICATIONS

Almond, et al, *Factors Affecting Proppant Flowback with Resin Coated Proppants, SPE 30096*, published 1995, Society of Petroleum Engineers, Inc., pp. 171-186.

(Continued)

*Primary Examiner*—George Suchfield
(74) *Attorney, Agent, or Firm*—Robert A. Kent; Baker Botts, L.L.P.

(57) ABSTRACT

A method of treating a subterranean formation or of stabilizing a surface within a subterranean fracture comprising: providing a treatment fluid comprising lightweight proppant at least partially coated with an adhesive substance; introducing the treatment fluid into a portion of a subterranean formation; depositing at least a portion of the lightweight proppant in the portion of the subterranean formation; allowing at least a portion of the lightweight proppant in the subterranean formation to form a particulate pack; and, allowing at least a portion of the adhesive substance to migrate from the lightweight particulates to a surface within the portion of the subterranean formation.

20 Claims, No Drawings

U.S. PATENT DOCUMENTS

| | | | |
|---|---|---|---|
| 3,960,736 A | 6/1976 | Free et al. | 252/8.55 R |
| 4,008,763 A | 2/1977 | Lowe et al. | 166/253 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 C |
| 4,074,760 A | 2/1978 | Copeland et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/276 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/276 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutta et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Csabai et al. | 521/63 |
| 5,232,961 A | 8/1993 | Murphey et al. | 523/414 |
| 5,238,068 A | 8/1993 | Fredickson | 166/307 |
| 5,247,059 A | 9/1993 | Gruber et al. | 528/354 |
| 5,249,628 A | 10/1993 | Surjaatmadja | 166/305 |
| 5,256,729 A | 10/1993 | Kutta et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,363,916 A | 11/1994 | Himes et al. | 166/276 |
| 5,373,901 A | 12/1994 | Norman et al. | 166/300 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,494,103 A | 2/1996 | Surjaatmadja et al. | 166/222 |
| 5,494,178 A | 2/1996 | Nguyen et al. | 166/276 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Surles et al. | 166/278 |
| 5,551,514 A | 9/1996 | Nelson et al. | 166/280 |
| 5,582,249 A | 12/1996 | Caveny et al. | 166/276 |

| Patent No. | Date | Name | Class |
|---|---|---|---|
| 5,582,250 A | 12/1996 | Constien | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/219 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,697,440 A | 12/1997 | Weaver et al. | 166/281 |
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Surles | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 174/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 257/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,644 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/294 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B2 | 12/2001 | Chatterji et al. | 166/295 |
| 6,350,309 B2 | 2/2002 | Chatterji et al. | 106/677 |
| 6,357,527 B1 | 3/2002 | Norman et al. | 166/300 |
| 6,364,018 B1 | 4/2002 | Brannon et al. | 166/280 |
| 6,364,945 B1 | 4/2002 | Chatterji et al. | 106/677 |
| 6,367,165 B1 | 4/2002 | Hüttlin | 34/582 |
| 6,367,549 B1 | 4/2002 | Chatterji et al. | 166/292 |
| 6,372,678 B1 | 4/2002 | Youngsman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B2 | 6/2002 | Davidson et al. | 166/249 |
| 6,406,789 B1 | 6/2002 | McDaniel et al. | 428/402 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,440,255 B1 | 8/2002 | Kohlhammer et al. | 156/283 |

| | | | |
|---|---|---|---|
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengel et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,503,870 B2 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |
| 6,569,814 B1 | 5/2003 | Brady et al. | 507/201 |
| 6,582,819 B2 | 6/2003 | McDaniel et al. | 428/402 |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/308 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nugyen et al. | 166/281 |
| 6,710,019 B1 | 3/2004 | Sawdon et al. | 507/136 |
| 6,713,170 B1 | 3/2004 | Kaneko et al. | 428/323 |
| 6,725,926 B2 | 4/2004 | Nguyen et al. | 166/254.1 |
| 6,725,931 B2 | 4/2004 | Nguyen et al. | 166/280.2 |
| 6,729,404 B2 | 5/2004 | Nguyen et al. | 166/280.2 |
| 6,732,800 B2 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B2 | 7/2004 | Nguyen et al. | 166/300 |
| 6,776,236 B1 | 8/2004 | Nguyen | 166/279 |
| 6,832,650 B2 | 12/2004 | Nguyen et al. | 166/279 |
| 6,851,474 B2 | 2/2005 | Nguyen | 166/279 |
| 6,887,834 B2 | 5/2005 | Nguyen et al. | 507/221 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lunghofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006096 A1 | 1/2005 | Nguyen et al. | 166/295 |
| 2005/0045326 A1 | 3/2005 | Nguyen | 166/278 |
| 2006/0048943 A1* | 3/2006 | Parker et al. | 166/308.1 |

FOREIGN PATENT DOCUMENTS

| | | |
|---|---|---|
| EP | 0 313 243 A2 | 4/1989 |
| EP | 0 313 243 A3 | 4/1989 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0 864 726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1 326 003 A1 | 7/2003 |
| EP | 1362978 A1 | 11/2003 |
| EP | 1 394 355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 2004/037946 A1 | 5/2004 |
| WO | WO 2004/038176 A1 | 5/2004 |
| WO | WO 2005/021928 A2 | 3/2005 |

OTHER PUBLICATIONS

Foreign Search Report and Opinion (CPW 21582 EP).
S. W. Almond, et al., "*Factors Affecting Proppant Flowback With Resin Coated Proppants*," Society of Petroleum Engineers, Inc., SPE 30096, pp. 171-186, 1995.
Halliburton, *CoalStim$^{SM}$ Service, Helps Boost Cash Flow From CBM Assets*, Stimulation, HO3679 Oct. 2003, Halliburton Communications.

Halliburton, *Conductivity Endurance Technology For High Permeability Resevoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.

Halliburton Technical Flier—Multi Stage Frac Completion Methods, 2 pages, undated.

Halliburton "*CobraFrac$^{SM}$ Service, Coiled Turbing Fracturing—Cost-Effective Method for Stimulating Untapped Reserves*", 2 pages, 2004.

Halliburton "*CobraJetFrac$^{SM}$ Service, Cost-Effective Technology That Can Help Reduce Cost per BOE Produced, Shorten Cycle time and Reduce Capex*", undated.

Halliburton Cobra Frac Advertisement, 2001.

Halliburton "*SurgiFrac$^{SM}$ Service, a Quick and cost-Effective Method to Help Boost Production From Openhole Horizonal Completions*", 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al, 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, "*Water and Gas Cyclic Pulsing Method for Improved Oil Recovery*", SPE 3005, 1971.

Peng et al., "*Pressure Pulsing Waterflooding in Dual Porosity Naturally Fractured Reservoirs*" SPE 17587, 1988.

Dusseault et al, "*Pressure Pulse Workovers in Heavy Oil*", SPE 79033, 2002.

Yang et al., "*Experimental Study on Fracture Initiation By Pressure Pulse*", SPE 63035, 2000.

Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.

Advances in Polymer Science, vol. 157, "*Degradable Aliphatic Polyesters*" edited by A.-C. Alberston, 2001.

Gorman, *Plastic Electric: Lining up the Future of Conducting Polymers* Science News, vol. 163, May 17, 2003.

Gidley et al., "*Recent Advances in Hydraulic Fracturing*," Chapter 6, pp. 109-130, 1989.

Simmons et al., "*Poly(phenyllactide): Synthesis, Characterization, and Hydrolytic Degradation, Biomacromolecules*", vol. 2, No. 2, pp. 658-663, 2001.

Yin et al., "*Preparation and Characterization of Substituted Polylactides*", Americal Chemical Society, vol. 32, No. 23, pp. 7711-7718, 1999.

Yin et al., "*Synthesis and Properties of Polymers Derived from Substituted Lactic Acids*", American Chemical Society, Ch. 12, pp. 147-159, 2001.

Cantu et al., "*Laboratory and Field Evaluation of a Combined Fluid-Loss Control Additive and Gel Breaker for Fracturing Fluids,*" SPE 18211, 1990.

Love et al., "*Selectively Placing Many Fractures in Openhole Horizontal Wells Improves Production*", SPE 50422, 1998.

McDaniel et al. "*Evolving New Stimulation Process Proves Highly Effective In Level 1 Dual-Lateral Completion*" SPE 78697, 2002.

Albertsson et al.,"*Aliphatic Polyesters: Synthesis, Properties and Applications*", Advances in Polymer Science, vol. 57 Degradable Aliphatic Polyesters, 2002.

Dechy-Cabaret et al., "*Controlled Ring-Operated Polymerization of Lactide and Glycolide*" American Chemical Society, Chemical Reviews, A-Z, AA-AD, 2004.

Funkhouser et al., "*Synthetic Polymer Fracturing Fluid For High-Temperature Applications*", SPE 80236, 2003.

*Chelating Agents*, Encyclopedia of Chemical Technology, vol. 5 (764-795), undated.

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @ www.cdxgas.com/solution.html, printed pp. 1-2, undated.

CDX Gas, "*What is Coalbed Methane?*" CDX, LLC. Available @ www.cdxgas.com/what.html, printed p. 1, undated.

Halliburton brochure entitled "H2Zero™ Service Introducing The Next Generation of cost-Effective Conformance Control Solutions", 2002.

Halliburton brochure entitled INJECTROL® A Component, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages, undated.

Yoary Attia, et al.., "*Adsorption Thermodynamics of a Hydrophobic Polymeric Flocculant on Hydrophobic Colloidal Coal Particulates*," American Chemical Society, p. 2203-2207, 1991.

SPE 82215, *Controlling Proppant Flowback in High-Temperature, High-Production Wells*. Nguyen, P., Weaver, J., May 2003.

SPE 90398, *Maximizing Effective Proppant Permeability under High-Stress, High Gas-Rate Conditions*. Dusterhoft, R., Nguyen, P., Conway, M., Sep. 2004.

\* cited by examiner

METHODS OF STABILIZING SURFACES OF SUBTERRANEAN FORMATIONS

CROSS-REFERENCE TO RELATED APPLICATIONS

This application is a continuation-in-part of U.S. application Ser. No. 10/972,648 filed on Oct. 25, 2004 now U.S. Pat. No. 7, 267,171 and titled "Methods and Compositions for Stabilizing the Surface of a Subterranean Formation," which is a continuation-in-part of U.S. application Ser. No. 10/407,643 filed on Apr. 4, 2003 and issued as U.S. Pat. No. 6,962,200, which is a continuation-in-part of U.S. application Ser. No. 10/260,888 filed on Sep. 30, 2002 and issued as U.S. Pat. No. 6,725,931, which is a continuation-in-part of U.S. application Ser. No. 10/183,200 filed Jun. 26, 2002 and issued as U.S. Pat. No. 6,729,404, which is a continuation-in-part of 10/163,183 filed Jun. 4, 2002, now abandoned, which is a continuation-in-part of U.S. application Ser. No. 10/041,142 filed on Jan. 8, 2002 and issued as U.S. Pat. No. 6,668,926.

BACKGROUND OF THE INVENTION

The present invention relates to methods and compositions of stabilizing a surface within a subterranean formation or fracture. More particularly, the present invention relates to stabilizing surfaces within a subterranean formation or fracture using lightweight proppant coated with an adhesive substance.

Hydrocarbon-producing wells are often stimulated by hydraulic fracturing treatments. In hydraulic fracturing treatments, a viscous fracturing fluid, which also functions as a carrier fluid, is pumped into a producing zone at a rate and pressure such that one or more fractures are formed in the zone. Typically, particulates, such as graded sand, suspended in a portion of the fracturing fluid are then deposited in the fractures when the fracturing fluid is converted to a thin fluid to be returned to the surface. These particulate solids, or "proppant particulates," serve to prevent the fractures from fully closing so that conductive channels are formed through which produced hydrocarbons can flow.

To prevent the subsequent flowback of proppant and other particulates with the produced fluids, a portion of the proppant introduced into the fractures may be coated with a curable resin or tackifying agent that may facilitate the consolidation of the proppant particles in the fracture. The partially closed fractures apply pressure to the coated proppant particulates whereby the particulates are forced into contact with each other while the resin or tackifying agent enhances the grain-to-grain contact between individual proppant particles. The action of the pressure and the resin or tackifying agent bring about the consolidation of the proppant particles into a permeable mass having compressive and tensile strength, while allowing small amounts of deformation at the surface of the proppant packs to reduce the effects of point loading and/or to reduce proppant crushing.

Most proppant pack treatments have focused on consolidating the proppant pack itself, neglecting the importance of the interaction between the mechanical properties of the subterranean formation in which the proppant pack is placed and the proppant pack. These interactions can have a dramatic effect on overall fracture conductivity. In particular, under high stress and/or high flow conditions, formation material can intrude into the proppant pack, potentially damaging the pack. The intrusion of formation material into the proppant pack can also increase the amount of point loading and/or proppant crushing experienced by the proppant pack. These phenomena can reduce the overall conductivity of the propped fracture and/or the permeability of the proppant pack, which may negatively affect the production of the well.

SUMMARY OF THE INVENTION

The present invention relates to methods and compositions of stabilizing a surface within a subterranean formation or fracture. More particularly, the present invention relates to stabilizing surfaces within a subterranean formation or fracture using lightweight proppant coated with an adhesive substance.

One embodiment of the present invention provides a method of treating a subterranean formation comprising: providing a treatment fluid comprising lightweight proppant at least partially coated with an adhesive substance; introducing the treatment fluid into a portion of a subterranean formation; depositing at least a portion of the lightweight proppant in the portion of the subterranean formation; allowing at least a portion of the lightweight proppant in the subterranean formation to form a particulate pack; and, allowing at least a portion of the adhesive substance to migrate from the lightweight particulates to a surface within the portion of the subterranean formation.

Another embodiment of the present invention provides a method of stabilizing a surface within a subterranean fracture, comprising: providing a treatment fluid comprising lightweight proppant at least partially coated with an adhesive substance; introducing the treatment fluid into the subterranean fracture; depositing the lightweight proppant in the subterranean fracture so as to form a proppant pack; and, allowing at least a portion of the adhesive substance to migrate from the lightweight proppant to a surface within the fracture.

Another embodiment of the present invention provides a method of fracturing a subterranean formation, comprising: providing a fracturing fluid comprising lightweight particulates at least partially coated with an adhesive substance; introducing the fracturing fluid into a subterranean formation at a pressure sufficient to create or enhance at least one fracture therein; depositing at least a portion of the lightweight particulates in the at least one fracture having at least one fracture face; and, allowing at least a portion of the adhesive substance to migrate from the lightweight particulates to at least one fracture face.

The features and advantages of the present invention will be readily apparent to those skilled in the art upon a reading of the description of the preferred embodiments that follows.

DESCRIPTION OF PREFERRED EMBODIMENTS

The present invention relates to methods and compositions of stabilizing a surface within a subterranean formation or fracture. More particularly, the present invention relates to stabilizing surfaces within a subterranean formation or fracture using lightweight proppant coated with an adhesive substance.

In accordance with the present invention, lightweight proppant at least partially coated with an adhesive substance may be used to stabilize a surface within a subterranean formation, such as the face of a fracture, perforation tunnel walls, formation face of an open hole completion interval, or the walls of a well bore. As used herein, the term "adhesive substance" refers to a material (such as a resin or tackifier) that is capable of being coated onto a particulate and that at least temporarily exhibits a sticky or tacky character such that the proppant particulates that have adhesive thereon have a tendency to adhere to adjacent surfaces be those surfaces other particulates, fracture faces or subterranean surfaces, or combinations thereof. In the methods of the present invention, the adhesive substance is coated onto lightweight proppant in a flowable (i.e., substantially liquid) form and remains flowable at least until the coated proppant is placed in contact with a surface within the subterranean formation. Once deposited on or near a surface within a subterranean formation, the adhesive substances may migrate from the proppant to the surface where it may then act to at least partially stabilize the surface. This stabilization of the surface may dramatically improve the permeability of a proppant pack placed within a fracture wherein the face has been so stabilized. Furthermore, stabilization of a fracture face may prevent the intrusion of formation material into the proppant pack, minimizing the damage that can occur to the proppant pack under high stress and/or high flow conditions.

Generally, any treatment fluid suitable for use in a subterranean application may be used in accordance with the teachings of the present invention, including water, brine, oil, weighted water, aqueous gels, viscoelastic surfactant gels, oil gels, foams, a gas, an emulsions, and combinations thereof. In embodiments wherein a gas is used as all or part of the treatment fluid, nitrogen, carbon dioxide, or some combination thereof may be preferred. Suitable aqueous gels are generally comprised of water and one or more gelling agents. Suitable emulsions can be comprised of two immiscible liquids such as an aqueous gelled liquid and a liquefied gas, such as carbon dioxide or nitrogen. In exemplary embodiments of the present invention, the treatment fluids are aqueous gels that comprise water, a gelling agent for increasing viscosity, and, optionally, a crosslinking agent for crosslinking the gelling agent to further increase the viscosity of the fluid to form a crosslinked treatment fluid. The increased viscosity of the gelled, or gelled and cross-linked, treatment fluid, inter alia, reduces fluid loss and allows the treatment fluid to transport significant quantities of suspended proppant particles. The water used to form the treatment fluid may be salt water, brine, or any other aqueous liquid that does not adversely react with the other components.

A variety of gelling agents may be used, including hydratable polymers that contain one or more functional groups such as hydroxyl, carboxyl, sulfate, sulfonate, amino, or amide groups. Suitable gelling agents typically comprise polysaccharides, biopolymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof, that contain one or more of these monosaccharide units: galactose; mannose; glucoside; glucose; xylose; arabinose; fructose; glucuronic acid; or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091, issued Dec. 3, 2002 to Weaver, et al., the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein.

In some embodiments the present invention, the density of the treatment fluid may be increased using one or more weighting agents, that is, solid particles that may be suspended in a fluid to increase its density (and thus its particulate carrying ability). In some embodiments such weighting agents may be used in addition to other viscosifying agents (such as guar) and in other embodiments they may be used alone. In some embodiments the chosen weighting agent may confer benefits beyond just increasing the treatment fluid's density. In particular, where a chosen weighting agent is a material that will degrade over time in the treatment fluid or in the fluids present in the subterranean formation being treated, the weighting agent may also act to increase the porosity of a resultant proppant pack. By way of example, when a weighting agent comprising a salt is used in a treatment fluid carrying proppant to form a proppant pack, once the pack is formed the salt may degrade or dissolve over time leaving behind void spaces in the proppant pack. The weighting material may be selected to degrade in the subterranean environment or to remain permanently. As one skilled in the art may recognize, in embodiments wherein it is desirable for the weighting agent to degrade, it may be selected to be water-degradable or oil-degradable depending on the subterranean environment to which the weighting agent will be exposed.

Crosslinking agents may be used to crosslink gelling agent molecules to form crosslinked gelling agents. Crosslinkers typically comprise at least one metal that is capable of crosslinking at least two gelling agent molecules. Examples of suitable crosslinkers include, but are not limited to, zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24," available from Halliburton Energy Services, Inc., Duncan, Okla. An example of a suitable commercially available titanium-based crosslinker is "CL-39," available from Halliburton Energy Services, Inc., Duncan Okla. Suitable crosslinkers generally are present in the viscosified treatment fluids of the present invention in an amount sufficient to provide, inter alia, the desired degree of crosslinking between gelling agent molecules. In certain exemplary embodiments of the present invention, the crosslinkers may be present in an amount in the range from about 0.001% to about 10% by weight of the water in the fracturing fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzymes, oxidizing agents, acid buffers, or temperature-activated gel breakers. The gel breakers cause the viscous treatment fluids to revert to thin fluids that can be produced back to the surface after they have been used to place proppant particulates in subterranean fractures. The gel breaker used is typically present in the treatment fluid in an amount in the range of from about 0.5% to about 10% by weight of the gelling agent. The treatment fluids may also include one or more of a variety of well-known additives, such as gel stabilizers, fluid loss control additives, clay stabilizers, bactericides, and the like.

Any suitable lightweight proppant may be used in accordance with the teachings of the present invention, including lightweight sand, lightweight nut shells, lightweight seed shells, lightweight bauxite materials, lightweight ceramic materials, lightweight glass materials, lightweight polymer beads, lightweight composite particles, lightweight resinous materials, lightweight resinous materials comprising nut shells and/or seed shells, combinations thereof, and the like. As used herein, "lightweight proppant" refers to any proppant having a specific gravity of less than about 2.7. In some embodiments, lightweight proppant particulates of the present invention have a specific gravity from about 0.7 to about 2.7. In other embodiments, lightweight proppant particulates of the present invention have a specific gravity of less than about 2.5. In other embodiments, lightweight proppant particulates of the present invention have a specific gravity of less than about 2.2. In other embodiments, lightweight proppant particulates of the present invention have a specific gravity of less than about 2. In other embodiments, lightweight proppant particulates of the present invention have a specific gravity of less than about 1.7. In other embodiments, lightweight proppant particulates of the present invention have a specific gravity of less than about 1.5. In other embodiments, lightweight proppant particulates of the present invention have a specific gravity of less than about 1.3. In other embodiments, lightweight proppant particulates of the present invention have a specific gravity of less than about 1. Some suitable lightweight proppant particulates are described in U.S. Pat. Nos. 6,632,527, 6,582,819, 6,749,025, 6,364,018, 5,582,250, 5,531,274, 4,969,523, 4,850,430, and 4,733,729, the relevant disclosures of which are hereby incorporated by reference. In particular embodiments of the present invention, the lightweight proppant particulates may be of a size such that formation fines that may migrate with produced fluids are prevented from being produced from the subterranean zone. Generally, the proppant particulates have a size in the range of from about 2 mesh to about 400 mesh, U.S. Sieve Series. In some embodiments of the present invention, the proppant is graded sand having a particulate size in the range of from about 10 mesh to about 70 mesh, U.S. Sieve Series. In particular embodiments, preferred proppant particulate size distribution ranges are one or more of 10-20 mesh, 20-40 mesh, 40-60 mesh, or 50-70 mesh, depending on the particular size and distribution of formation solids to be screened out by the proppant particulates. It should be understood that the term "proppant," as used in this disclosure, includes all known shapes of materials, including substantially spherical materials, fibrous materials, polygonal materials (such as cubic materials) and mixtures thereof. Moreover, fibrous materials that may or may not be used to bear the pressure of a closed fracture are often included in proppant and gravel treatments to, among other things, increase the conductivity of a resulting pack by forming highly conductive channels.

Generally, the lightweight proppant particulates of the present invention are at least partially coated with an adhesive substance. Any adhesive substance capable of migrating from the surface of the proppant to a surface of the subterranean formation may be used in accordance with the teachings of the present invention. Suitable adhesive substances include, but are not limited to, resins, nonaqueous tackifying agents, aqueous tackifying agents, and silyl-modified polyamides.

Resins suitable for use in the consolidation fluids of the present invention include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins, generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Selection of a suitable resin may be affected by the temperature of the subterranean formation to which the fluid will be introduced. By way of example, for subterranean formations having a bottom hole static temperature (BHST) ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use in the present invention. Some preferred solvents are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

Tackifying agents suitable for use in the present invention include nonaqueous tackifying agents, aqueous tackifying agents, and silyl-modified polyamides. In addition to encouraging the proppant particulates to form aggregates, the use of a tackifying agent may yield a propped fracture that experiences very little or no undesirable proppant flow back. The application of a tackifying agent to the proppant particulates may aid in the formation of aggregates that increase the ability of a smaller amount of proppant particulates to effectively hold open a fracture for production. Tackifying agents may be applied on-the-fly, applying the adhesive substance to the proppant particulate at the well site, directly prior to pumping the fluid-proppant mixture into the well bore.

One type of tackifying agent suitable for use in the present invention is a nonaqueous tackifying agent. A particularly preferred group of tackifying agents comprise polyamides that are liquids or in solution at the temperature of the subterranean formation such that they are, by themselves, nonhardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as nonaqueous tackifying compounds include liquids and solutions of, for example, polyesters, polycarbonates and polycarbamates, natural resins such as shellac and the like. Other suitable nonaqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

Nonaqueous tackifying agents suitable for use in the present invention may be either used such that they form non-hardening coating or they may be combined with a multifunctional material capable of reacting with the nonaqueous tackifying agent to form a hardened coating. A "hardened coating," as used herein, means that the reaction of the tackifying compound with the multifunctional material will result in a substantially non-flowable reaction product that exhibits a higher compressive strength in a consolidated agglomerate than the tackifying compound alone with the particulates. In this instance, the nonaqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde-releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01% to about 50% by weight of the tackifying compound to effect formation of the reaction product. In some preferable embodiments, the compound is present in an amount of from about 0.5% to about 1% by weight of the tackifying compound. Suitable multifunctional materials are described in U.S. Pat. No. 5,839,510, issued to Weaver, et al., the relevant disclosure of which is herein incorporated by reference.

Solvents suitable for use with the nonaqueous tackifying agents of the present invention include any solvent that is compatible with the nonaqueous tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Aqueous tackifyier agents suitable for use in the present invention are not significantly tacky when placed onto a particulate, but are capable of being "activated" (that is, destabilized, coalesced, and/or reacted) to transform the compound into a sticky, tackifying compound at a desirable time. Such activation may occur before, during, or after the aqueous tackifier agent is placed in the subterranean formation. In some embodiments, a pretreatment may be first contacted with the surface of a particulate to prepare it to be coated with an aqueous tackifier agent. Suitable aqueous tackifying agents are generally charged polymers that comprise compounds that, when in an aqueous solvent or solution, will form a nonhardening coating (by itself or with an activator) and, when placed on a particulate, will increase the continuous critical resuspension velocity of the particulate when contacted by a stream of water. The aqueous tackifier agent may enhance the grain-to-grain contact between the individual particulates within the formation (be they proppant particulates, formation fines, or other particulates), helping bring about the consolidation of the particulates into a cohesive, flexible, and permeable mass.

Examples of aqueous tackifier agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers, and combinations thereof. Methods of determining suitable aqueous tackifier agents and additional disclosure on aqueous tackifier agents can be found in U.S. patent application Ser. No. 10/864,061, and filed Jun. 9, 2004, and U.S. patent application Ser. No. 10/864,618, and filed Jun. 9, 2004 the relevant disclosures of which are hereby incorporated by reference.

Another tackifying agent suitable for in the present invention is a silyl-modified polyamide compound that may be described as a substantially self-hardening composition that is capable of at least partially adhering to particulates in the unhardened state, and that is further capable of self-hardening itself to a substantially non-tacky state to which individual particulates such as formation fines will not adhere, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, issued to Matherly, et al., the relevant disclosure of which is herein incorporated by reference.

In particular embodiments of the present invention, proppant particulates are coated with the adhesive substance, typically on-the-fly, the coated proppant particulates are suspended in the fracturing fluid, also typically on-the-fly, and the resulting adhesive substance-coated proppant particles are placed in one or more fractures formed in a subterranean zone. The term "on-the-fly" is used herein to mean that a flowing stream is continuously introduced into another flowing stream so that the streams are combined and mixed while continuing to flow as a single stream as part of an ongoing treatment. Forming an adhesive substance, coating the proppant particles with the adhesive substance, and mixing the adhesive substance-coated proppant particles with the fracturing fluid may be typically performed on-the-fly. Such mixing can also be described as "real-time" mixing. As is well understood by those skilled in the art, such mixing may also be accomplished by batch or partial batch mixing. One benefit of on-the-fly mixing over batch or partial batch mixing, however, involves reducing waste of the adhesive substance and any components the adhesive substance may have. For example, in adhesive substances comprising a hardenable resin component and a hardening agent component, once the hardenable resin component and hardening agent component are mixed, the mixture must be used within a short time frame or the resin will cure and the mixture will no longer be pumpable as a result of increase in its viscosity. Thus, if the components are mixed and then circumstances dictate that the well operation be stopped or postponed, the mixed components may quickly become unusable. By having the ability to rapidly shut down the mixing of the adhesive substance components on-the-fly, this unnecessary waste can be avoided, resulting in, among other things, increased efficiency and cost savings.

As mentioned above, during the time that the hardenable resin component and the hardening agent component are mixed and coated on the proppant particulates, the rate of addition of the hardening agent component can be varied while the rate of addition of the hardenable resin component is held constant. Stated another way, in addition to varying whether or not the proppant particulates are coated at all, the volume ratio of the adhesive substance components on those particulates that are coated may be varied as well. This volume ratio may be varied to obtain a desired level of consolidation or toughness for the proppant pack. For example, in adhesive substances comprising a hardening agent component and a hardenable resin component, by increasing the volume ratio of the hardening agent component to the hardenable resin component, the proppant pack may possess a more elastic structure as compared to that when using a reduced volume ratio of the hardening agent component to the hardenable resin component. It should be within the ability of one of ordinary skill in the art, with the benefit of this disclosure, to determine the suitable ratio of components to meet the desired goals.

Once the adhesive substance-coated proppant particulate is deposited into the subterranean fracture, at least a portion of the adhesive substance tends to migrate from the surface of the proppant to a surface with the abutting subterranean formation. This migration is thought to be possible, in part, because the adhesive substance is coated on the proppant particulates in a flowable form and remains flowable at least until the coated proppant particulates are placed in contact with a surface within the subterranean formation. Generally, at least a portion of the resin on the proppant particulates in contact with the fracture face migrates from the proppant to the fracture face through one or more forms of mass transfer (e.g., capillary action, diffusion, adhesion). For example, the adhesive substance may migrate onto the fracture face as a result of the capillary action of formation sand that causes the resin to spread, smear, and/or coat onto the formation grains. This migration of the adhesive substance from the proppant particulates to the fracture face results in stabilization of fracture face, thus mitigating the movement or migration of formation materials, and allowing the conductivity of propped fracture to be maintained under low stress conditions. Under high stress conditions and/or high flow rate conditions, the amount of formation material intruding into the proppant pack may also be reduced.

Even under extreme stress conditions where the proppant particulate crushes, the fracture stabilization provided by particular embodiments of the present invention may also be beneficial. Typically under extreme stress conditions, the use of uncoated proppant particulates has resulted in excessive amounts of formation fines migrating into the pore spaces of the proppant pack. However, the stabilization provided by particular embodiments of the present invention may reduce the amount of formation fines migrating and penetrating into the proppant pack, helping to keep the pore spaces between the proppant grains from being plugged by the formation particulate, and to maintain the flow path and the conductivity of the propped fracture.

Adhesive substance-coated proppant may provide some advantages as compared to uncoated proppant. Such advantages include, among other things, providing a stable, consolidated, and permeable pack able to at least partially withstand the effects of stress cycling and prevent proppant from flowing out of the fracture during production of the well; allowing fines or fine fragments generated from crushed proppant as a result of being exposed to high closure stresses of closing fracture to be confined or entrapped inside the layer of adhesive substance encapsulating the proppant, so they cannot disperse and migrate within the proppant pack; stabilizing the formation materials along the fracture face to keep them from invading into and migrating in the proppant pack, causing pore spaces to be plugged; and increasing the effective contact area between the proppant particulates and the fracture face through accumulation of the resin at the contact points, which may reduce the point load stresses applied as the fracture closes and may thus reduce the amount of formation embedment or intrusion into the proppant pack. The stabilized region created around the points of contact between the proppant grains and the formation face serves to increase the effective area of contact. As a result, there may be a reduction in point loading forces between the proppant and on the formation face helping to reduce deformation of the fracture face or embedment of the proppant into the formation face due to the very high point loads that are seen at the initial points of contact. Stabilization of the formation face and creation of increased contact area may also help disperse the stress load and reduce the amount of embedment of the proppant into the formation face. The result of this may be increased fracture width and increased effective porosity in the proppant pack which may, in turn, result in higher permeability and fracture conductivity.

To facilitate a better understanding of the present invention, the following examples of preferred embodiments are given. In no way should the following examples be read to limit or define the scope of the invention.

EXAMPLE 1

Six sets of experiments were performed to evaluate three different types of proppant particulates along with a two-component high temperature epoxy resin system as used in a fracturing operation. In each case, the resin was used at 3% by weight of proppant particulates. The proppant particulate types included 20/40 bauxite (known to handle up to about 12,000 psi without substantial crushing), 18/40 intermediate strength proppant (ISP) (known to handle up to about 8,000 psi without substantial crushing), and 20/40 economical lightweight proppant (ELP) (known to handle up to about 6,000 psi without substantial crushing). The test temperature was steady at 250° F. for all tests. Stress was increased over a period of several days from 2,000 psi to 12,000 psi, allowing measurements to be taken at each condition. A baseline test of uncoated proppant particulates was performed for each material, and each type of proppant particulates was tested with a liquid coated resin (LCR) that would cure over time to form a hard coating and a strong mechanical bond between the proppant grains.

The effects of the closure stresses and flow rates on resin-treated proppant were evaluated with an API-linear conductivity cell. Each proppant sample was placed between the two core slabs within the test cell. The proppant particulates were leveled with a blade device inside the cell before being sandwiched between the core wafers to form a cell assembly. The cell was staked to within 0.002 inches from top to bottom and positioned between the platens of a Dake Press. Each cell was made a part of the three-cell evaluation stack, which included control (i.e., uncoated) proppant particulates and LCR-treated proppant particulates.

To measure conductivity, the test cell was loaded with the appropriate proppant pack placed between Ohio sandstone wafers and placed into the press where closure stress and temperature were applied to the specified test conditions. Pressure was increased to 500 psi, and the system was evacuated and saturated with 2% KCl at 70° F.-75° F. Once saturated, the closure pressure was increased to 1,000 psi, at a rate of 100 psi/min.

Conductivity was then measured with a flow through the proppant pack. The flow rate pressure differential and average width were measured at each pressure to calculate the conductivity and permeability. Five measurements were taken and averaged to arrive at each reported conductivity. Flow rate was measured with a Liquiflow meter calibrated with a Mettler balance to 0.01 ml/min. Darcy's Law was used for the calculations to determine the conductivity and permeability.

The test temperature was then increased to 250° F. and allowed to equilibrate. The temperature was maintained at 250° F. for 12 hours before increasing the closure stress. The conductivity and permeability of the proppant were then determined at 1,000 psi and 250° F. The closure stress was then increased at a rate of 100 psi/min to the next closure stress, and conductivity and permeability measurements were taken as described above.

The conductivity and permeability of each proppant pack was continuously monitored at 2,000 psi and 250° F. for a minimum of 25 to 30 hours. Following this time period, a high-velocity, non-Darcy gas evaluation was performed by increasing the gas rate to an equipment maximum of about 290 standard liters per minute (SLM) and flowing until pressure differential flat lines (dry state) were obtained. The flow rate was then decreased, stopping at selected intermittent rates, until 30 to 35 SLM was achieved. A secondary calibrated Flow Prover monitored the gas flow rate at the exit of the test cell for the calculation of the gas flow rate. Zeros were rechecked, and the rate was increased back to the previous highest flow rate and the down-rate ramp repeated. As closure stresses increased, the highest velocity was limited by imposing a maximum pressure drop limit of 50 psi/5 inches for the pressure differential (and/or maximum equipment flowing pressure was obtained versus flow rate). Following each gas evaluation of the test cells at 2,000 psi closure stresses, 2% KCl was re-introduced into the proppant pack and the cell was de-gassed before a final measurement of conductivity was obtained.

The conductivity and permeability of the proppant packs were also measured at closure stresses of 4,000, 6,000, 8,000, 10,000, and 12,000 psi. In several tests, steel plates were used to encase the proppant pack to help differentiate the effects of curable resin in controlling fines that have been generated from crushed proppant or from fines that have been introduced from the Ohio core wafers.

For all three proppants, there was a significant increase in fracture conductivity and proppant pack permeability for the LCR-coated proppants versus the uncoated proppants. The improvement in fracture conductivity and proppant pack permeability was pronounced under the lower stress conditions. Under lower stress conditions, the LCR-coated proppants showed a near-parallel trend to the uncoated proppants, essentially showing that the proppant pack permeability and fracture conductivity of the LCR-coated proppants were consistently higher than those of the uncoated proppants. In all cases, there was a stress at which the conductivity of the LCR-coated proppants began to converge with the uncoated proppant baseline conductivity/proppant pack permeability. The point at which this convergence initiated was different for each type of proppant particulate.

The measured cell width, which corresponds closely to the width of the proppant pack, showed trends nearly identical to those seen in the proppant pack permeability and fracture conductivity. This suggests that there is greater porosity in the cells with the coated proppants as opposed to the ones with uncoated proppants.

A number of observations were made upon visual inspection of the proppant packs during disassembly of the conductivity test equipment. In all cases, there was evidence of formation material penetrating into the proppant pack. For all three proppants, the amount of formation material that appeared to be filling pore spaces in the proppant pack was much greater for the uncoated proppants. The coated proppants showed much less formation intrusion and much less formation material filling the porosity of the proppant pack. In the bauxite tests, it was difficult to make any judgment regarding the quantity of crushed proppant in the individual tests. For ISP and ELP, it was possible to detect significant variation. In these cases, LCR-coated proppants showed a much more stable interface at the formation-proppant interface, and severe proppant crushing in the center of the proppant pack. The uncoated proppants showed deeper formation intrusions and much less crushed proppant in the pack. It also appeared that the intrusion of formation fines into the proppant pack reduced the point loading on the individual proppant grains, thus reducing the amount of crushing.

With the LCR-coated proppants, there was evidence of a much more stable interface created between the proppant and formation material. The result of this behavior seemed to be an increase in the point loading between proppant grains. As a result, there was more proppant crushing when the cell was placed under extreme stress conditions for a given proppant. This suggests that stabilizing the interface between the proppant and formation material provided a means to achieve the maximum benefit from a given proppant and the effects of formation intrusion were dramatically reduced.

Visual inspection of the proppant face with the formation face removed show that the liquid resin actually accumulated slightly at the interface between the proppant particulates and the formation face. In the case of resin material, a thin layer of formation material actually appeared to be consolidated by resin material that had been drawn from the proppant to the formation, helping to create a stable interface. It also appeared that liquid resin would cure to form a rigid interface where puddle points around each individual proppant grain consolidated from small quantities of resin are drawn by capillary forces and surface effects.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of treating a subterranean formation comprising:
   providing a treatment fluid comprising a plurality of lightweight particulates at least partially coated with a substantially liquid adhesive substance;
   introducing the treatment fluid into a portion of a subterranean formation;
   depositing at least a portion of the lightweight particulates in the portion of the subterranean formation;
   allowing at least a portion of the lightweight particulates in the subterranean formation to form a particulate pack; and,
   allowing at least a portion of the substantially liquid adhesive substance to migrate from the lightweight particulates to a surface within the portion of the subterranean formation.

2. The method of claim 1 wherein the treatment fluid comprises at least one element chosen from the group consisting of: water, brine, oil, weighted water, a gas, an aqueous gel, a viscoelastic surfactant gel, an oil gel, an emulsion, and combinations thereof.

3. The method of claim 1 wherein the treatment fluid comprises a weighting agent for increasing the density of the treatment fluid and wherein the weighting agent is at least partially soluble in the fluids to which it will be exposed within the portion of the subterranean formation.

4. The method of claim 1 wherein the treatment fluid comprises water and a gelling agent.

5. The method of claim 1 wherein the lightweight particulates have a specific gravity of about 2.5 or below.

6. The method of claim 1 wherein the substantially liquid adhesive substance comprises a curable resin and wherein the curable resin comprises at least one element chosen from the group consisting of: a two component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resins, a hybrid polyester resin, a copolymer polyester resin, a polyurethane resin, a hybrid polyurethane resin, a copolymer polyurethane resin, an acrylate resin, and combinations thereof.

7. The method of claim 6 wherein the resin comprises a solvent and wherein the solvent comprises at least one element chosen from the group consisting of: butyl lactate, a butylglycidyl ether, a dipropylene glycol methyl ether, a dipropylene glycol dimethyl ether, a dimethyl formamide, a diethyleneglycol methyl ether, an ethyleneglycol butyl ether, a diethyleneglycol butyl ether, a propylene carbonate, methanol, a butyl alcohol, d'limonene, a fatty acid methyl ester, isopropanol, butanol, a glycol ether solvent, and combinations thereof.

8. The method of claim 1 wherein the substantially liquid adhesive substance comprises a nonaqueous tackifying agent and wherein the nonaqueous tackifying agent comprises at least one element chosen from the group consisting of: a polyamide, a polyester, a polycarbonate, polycarbamate, and a natural resin.

9. The method of claim 8 wherein the nonaqueous tackifying agent further comprises a multifunctional material and wherein the multifunctional material comprises at least one element chosen from the group consisting of: an aldehyde; a dialdehyde; a hemiacetal; an aldehyde releasing compound; a diacid halide; a dihalide; a polyacid anhydride; an epoxide; a furfuraldehyde, a glutaraldehyde condensate, an aldehyde condensate, and combinations thereof.

10. The method of claim 8 wherein the aqueous tackifying agent is made tacky through exposure to an activator and wherein the activator comprises at least one element chosen from the group consisting of: an organic acid, an anhydride of an organic acid, an inorganic acid, an inorganic salt, a charged surfactant, a charged polymer, and combinations thereof.

11. The method of claim 1 wherein the substantially liquid adhesive substance comprises an aqueous tackifying agent and wherein the aqueous tackifying agent comprises at least one element chosen from the group consisting of: an acrylic acid polymer, acrylic acid ester polymer, acrylic acid derivative polymer, acrylic acid homopolymer, acrylic acid ester homopolymer, acrylamido-methyl-propane sulfonate polymer, acrylamido-methyl-propane sulfonate derivative polymer, acrylamido-methyl-propane sulfonate co-polymer, acrylic acid/acrylamido-methyl-propane sulfonate co-polymer, a copolymer thereof, and combinations thereof.

12. The method of claim 1 wherein the substantially liquid adhesive substance comprises a silyl-modified polyamide and wherein the silyl-modified polyamide comprises at least one element chosen from the group consisting of: a reaction product of a silating compound with a polyamide, and a reaction product of a silating compound with a mixture of polyamides.

13. A method of stabilizing a surface within a subterranean fracture, comprising:
   providing a treatment fluid comprising a plurality of lightweight particulates at least partially coated with a substantially liquid adhesive substance;
   introducing the treatment fluid into the subterranean fracture;
   depositing at least a portion of the lightweight particulates in the subterranean fracture so as to form a proppant pack; and,
   allowing at least a portion of the substantially liquid adhesive substance to migrate from the lightweight particulates to a surface within the fracture.

14. The method of claim 13 wherein the lightweight particulates have a specific gravity of about 2.5 or below.

15. The method of claim 13 wherein the substantially liquid adhesive substance comprises a curable resin and wherein the curable resin comprises at least one element chosen from the group consisting of: a two component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resins, a hybrid polyester resin, a copolymer polyester resin, a polyurethane resin, a hybrid polyurethane resin, a copolymer polyurethane resin, an acrylate resin, and combinations thereof.

16. The method of claim 13 wherein the substantially liquid adhesive substance comprises at least one element chosen from the group consisting of: a nonaqueous tackifying agent, an aqueous tackifying agent, and a silyl-modified polyamide.

17. A method of fracturing a subterranean formation, comprising:
   providing a fracturing fluid comprising a plurality of lightweight particulates at least partially coated with a substantially liquid adhesive substance;
   introducing the fracturing fluid into a subterranean formation at a pressure sufficient to create or enhance at least one fracture therein;
   depositing at least a portion of the lightweight particulates in the at least one fracture having at least one fracture face; and,
   allowing at least a portion of the substantially liquid adhesive substance to migrate from the lightweight particulates to at least one fracture face.

18. The method of claim 17 wherein the lightweight particulates have a specific gravity of about 2.5 or below.

19. The method of claim 17 wherein the substantially liquid adhesive substance comprises a curable resin and wherein the curable resin comprises at least one element chosen from the group consisting of: a two component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resins, a hybrid polyester resin, a copolymer polyester resin, a polyurethane resin, a hybrid polyurethane resin, a copolymer polyurethane resin, an acrylate resin, and combinations thereof.

20. The method of claim 17 wherein the wherein the substantially liquid adhesive substance comprises at least one element chosen from the group consisting of: a nonaqueous tackifying agent, an aqueous tackifying agent, and a silyl-modified polyamide.

* * * * *